US012759651B2

(12) United States Patent
Grenzi et al.

(10) Patent No.: US 12,759,651 B2
(45) Date of Patent: Oct. 13, 2026

(54) TRACK LINK ASSEMBLY WITH WEAR SENSING DEVICE

(71) Applicants: Berco S.p.A., Copparo/Ferrara (IT); thyssenkrupp AG, Essen (DE)

(72) Inventors: Francesco Grenzi, Ferrara (IT); Enrico Maggiolini, Ferrara (IT); Piero Bruno, Fossa (IT)

(73) Assignees: Berco S.p.A., Copparo/Ferrara (IT); thyssenkrupp AG, Essen (DE)

( * ) Notice: Subject to any disclaimer, the term of this patent is extended or adjusted under 35 U.S.C. 154(b) by 204 days.

(21) Appl. No.: 18/729,454

(22) PCT Filed: Jan. 17, 2023

(86) PCT No.: PCT/EP2023/050948
§ 371 (c)(1),
(2) Date: Jul. 16, 2024

(87) PCT Pub. No.: WO2023/135319
PCT Pub. Date: Jul. 20, 2023

(65) Prior Publication Data

US 2025/0115314 A1 Apr. 10, 2025

(30) Foreign Application Priority Data

Jan. 17, 2022 (IT) ........................ 102022000000635

(51) Int. Cl.
*B62D 55/28* (2006.01)

(52) U.S. Cl.
CPC .................................... *B62D 55/28* (2013.01)

(58) Field of Classification Search
CPC ........ B62D 55/21; B62D 55/28; B62D 55/32; G01B 5/06; G01M 17/03; E02F 9/26
See application file for complete search history.

(56) References Cited

U.S. PATENT DOCUMENTS 4,105,260 A 8/1978 Blunier et al.
5,749,635 A 5/1998 Umbarger
(Continued)

FOREIGN PATENT DOCUMENTS

EP 3183164 B1 * 9/2018 ............... G01N 3/06
FR 2320220 A1 3/1977
(Continued)

OTHER PUBLICATIONS

English Translation of International Search Report issued in PCT/EP2023/050948, dated Jan. 10, 2023.

*Primary Examiner* — Adam D Rogers
(74) *Attorney, Agent, or Firm* — thyssenkrupp North America, LLC

(57) ABSTRACT

A track assembly of a track-type mobile machine comprises a track link body, a track shoe, a bolt, wherein the track shoe is clamped with the track link body along a clamping length of the bolt, the clamping length extending from a bolt head of the bolt to a fastening section of the bolt, and a wear sensing device for measuring wear of at least one surface portion of the track link body. The bolt comprises a bolt section adjoining the clamping length, the bolt section extending into a receiving bore arranged in the track link body, the receiving bore extending from the window opening to the surface portion of the track link body where the wear is to be measured, wherein at least the part of the bolt section received in the receiving bore comprises a recess in which the wear sensing device is arranged.

10 Claims, 1 Drawing Sheet

(56) References Cited

U.S. PATENT DOCUMENTS

| | | | | |
|---|---|---|---|---|
| 9,475,526 | B2 * | 10/2016 | McKinley | G01B 21/18 |
| 9,784,647 | B2 * | 10/2017 | Sidles | G01M 17/03 |
| 10,401,315 | B2 * | 9/2019 | Baarman | H10N 10/17 |
| 10,787,210 | B2 * | 9/2020 | Magner | B62D 55/28 |
| 11,479,310 | B2 * | 10/2022 | Akinlua | B62D 55/32 |
| 12,221,772 | B2 * | 2/2025 | Johannsen | E02F 9/26 |
| 12,365,406 | B2 * | 7/2025 | Zhang | B62D 55/32 |
| 2015/0066291 | A1 * | 3/2015 | Johannsen | B62D 55/32<br>701/34.4 |
| 2015/0081166 | A1 * | 3/2015 | Diekevers | B62D 55/14<br>701/34.4 |
| 2016/0052572 | A1 * | 2/2016 | McKinley | G01B 21/18<br>305/15 |
| 2022/0185399 | A1 | 6/2022 | Grenzi et al. | |
| 2024/0328461 | A1 * | 10/2024 | Grenzi | B62D 55/15 |
| 2025/0019939 | A1 * | 1/2025 | Johannsen | B62D 55/32 |

FOREIGN PATENT DOCUMENTS

| | | | | |
|---|---|---|---|---|
| WO | WO-0029276 | A1 * | 5/2000 | B62D 55/32 |
| WO | WO-2016099796 | A1 * | 6/2016 | G01M 17/03 |
| WO | 2020208179 | A1 | 10/2020 | |
| WO | WO-2023078772 | A1 * | 5/2023 | B62D 55/21 |

* cited by examiner

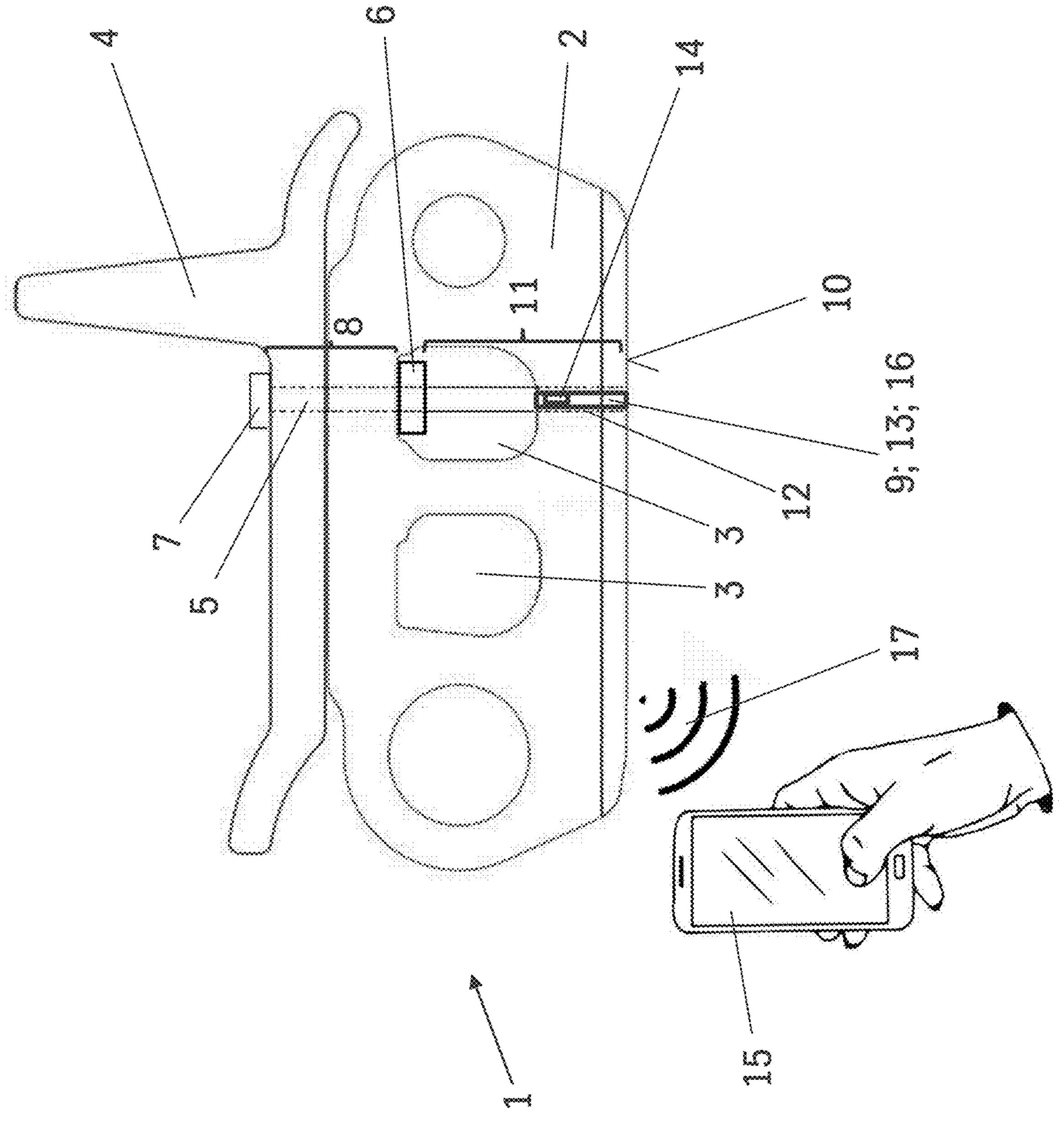
4
6
2
14
8
11
10
9; 13; 16
12
3
3
7
5
17
15
1

TRACK LINK ASSEMBLY WITH WEAR SENSING DEVICE

CROSS REFERENCE TO RELATED APPLICATIONS

This application is a U.S. National Stage Entry of International Patent Application Serial Number PCT/EP2023/050948, filed Jan. 17, 2023, which claims priority to Italian Patent Application No. IT 102022000000635, filed Jan. 17, 2022, the entire contents of both of which are incorporated herein by reference.

FIELD

The present disclosure generally relates to a track assembly of a track-type mobile machine.

BACKGROUND

WO 2020/208179 A1 describes a track assembly where the wear sensing device is inserted directly into a bore inside the track link. It is a disadvantage of this track assembly that it is rather difficult to remove the wear sensing device from the track link body or to replace an inserted wear sensing device (which is for example not working properly anymore) with a new wear sensing device.

The same disadvantage exists in relation to the track assembly described in EP 3 183 164 B1.

The wear data obtained with a wear sensing device mounted to the track link body can be used to perform predictive maintenance of the track assembly and to avoid expensive on-site repairs in case of a breakdown of the track assembly while the track-type mobile machine (such as a construction vehicle like a excavator or a mining vehicle like a dozer) is operating on a construction site or a remote mining site without access to any maintenance facilities.

Thus a need exists to provide a track assembly wherein the wear sensing device is easily removable from the track link body, and wherein a mounted wear sensing device can easily be replaced by a new one, as well as to provide a method for mounting a wear sensing device in a track assembly and a method for replacing a broken wear sensing device with a new one.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to the FIGURE, which illustrates a track assembly.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some embodiments, a track assembly is characterized in that the bolt comprises a bolt section adjoining the clamping length, the bolt section extending into a receiving bore arranged in the track link body, the receiving bore extending from the window opening to the surface portion of the track link body where the wear is to be measured, wherein at least the part of the bolt section received in the receiving bore comprises a recess in which the wear sensing device is arranged.

The concept of the present invention is based on the idea to modify the bolt by extending it beyond the clamping length into the receiving bore, and to utilize the extended bolt for providing a recess for receiving the wear sensing device. In this way, the wear sensing device is efficiently protected by the bolt against the rough operating conditions under which track chain construction machines operate. Failure and destruction of the wear sensing device is thereby prohibited and the lifetime of the wear sensing device enhanced.

At the same time, the wear sensing device is easily mountable to the track assembly, because the wear sensing device can easily be inserted into the recess in the bolt section via a press-fit either before or after the bolt section is inserted into the receiving bore in the track link body. In one embodiment the wear sensing device is inserted into the recess prior to mounting the bolt to the track assembly, and then the wear sensing device can be mounted to the track assembly simply by mounting the bolt to the track link body.

It is also an aspect of the present invention that it enables the easy replacement of a wear sensing device which is already mounted to a track link body in a track assembly with a new wear sensing device. According to an embodiment of the present invention, a method for replacing a wear sensing device mounted to a track link body in a track assembly comprises the steps of

- providing a replacement bolt with a clamping length section and a bolt section adjoining the clamping length section, wherein a new wear sensing device is inserted into the recess of the bolt section,
- removing the mounted bolt with the mounted wear sensing device from the track link body,
- and mounting the replacement bolt to the track link body.

According to one embodiment of the invention, the fastening section of the bolt is screwed into the receiving bore, so that the clamping length extends from the bolt head down to the receiving bore, wherein the bolt section extends from the fastening section of the bolt to the surface portion of the track link body. In this embodiment it is not necessary to screw a nut onto the bolt in order to clamp the shoe to the track link body. The nuts can be omitted and production costs can be lowered.

According to another embodiment of the invention, the fastening section of the bolt is screwed into a nut, wherein the nut is arranged inside the window opening, so that the clamping length extends from the bolt head down to the nut, wherein the bolt section extends from the fastening section of the bolt through the window opening down to the surface portion of the track link body. In this embodiment the bolt section, which is not bearing the clamping forces necessary for clamping the shoe to the track link body, extends all the way through the window opening and the receiving bore to the surface portion of the track link body of which the wear is to be measured. In this embodiment of the invention, the method of clamping the shoe between an bolt head and a nut, which has proven reliable in the industry, can be used. This way, the wear sensing device can easily be integrated into or retrofitted to existing track assembly designs using nuts and bolts for fastening the shoe to the track link body.

In a further embodiment of the track assembly according to the invention, the wear sensing device comprises a near-field communication (NFC) element for transmitting wear data from the wear sensing device to a data receiving device. In this embodiment the wear sensing device can be a passive device which does not need a power source like a battery or a different energy providing element. Therefore, the wear sensing device is always ready for operation and it is not necessary to exchange batteries or other power sources, thereby providing a low-maintenance wear sensing device arrangement.

However, the device for transmitting the wear data from the wear sensing device to the data receiving device need not be a passive device, but can also be an active device having a battery or another kind of power source. The data can be transmitted via Bluetooth or any other suitable technology for transmitting data.

In one embodiment of the invention, the recess is formed as a bore arranged coaxially with the bolt section, wherein the wear sensing device is arranged in the bore. This makes it easy to mount the wear sensing device to the bolt. Different ways of mounting the wear sensing device to the recess and securing it in the recess are possible.

In one embodiment of the present invention, the wear sensing device is pressed into the recess by means of a press fit. In this way, the wear sensing device is mounted quickly and is safely secured and held in position in the recess without making further mounting and securing steps necessary. Also, no retaining elements are necessary for retaining and securing the wear sensing device in the recess.

In an alternative embodiment, the wear sensing device can be screwed into the recess. In this embodiment, the recess has an internal thread and the wear sensing device has a housing with an external thread, wherein the wear sensing device is screwed into the recess with the external thread. This embodiment enables the exchange of the wear sensing device even without having to remove or exchange the bolt.

In one embodiment of the present invention, the wear sensing device comprises a wear portion which wears together with the surface portion of which the wear is to be measured. Such self-consuming wear sensing devices are very reliable and work well under the rough operating condition of track chain construction vehicles.

The only FIG. 1 shows schematically a track assembly 1 comprising a track link body 2 with window openings 3. A shoe 4 is attached to the track link body 2 via a bolt 5. The shoe 4 is clamped to the track link body 2 between a nut 6 and a bolt head 7. The section of the bolt 5 extending between the bolt head 7 and the nut 6 is a clamping length 8 of the bolt 5. Only in the section of clamping length 8 the bolt 5 has to bear the clamping load.

FIG. 1 only shows schematically one bolt 5 and one nut 6 arranged in the window opening 3 shown on the right hand side. A second bolt 5 and nut 6 is arranged (but not shown in FIG. 1 for clarity reasons) in the window opening 3 shown on the left hand side.

The bolt 5 comprises a bolt section 11 adjoining the clamping length 8. The bolt section 11 extends through the window opening 3 into a receiving bore 12 arranged in the track link body 2. The receiving bore 12 extends from the window opening 3 to the surface portion 10 of the track link body 2 where the wear is to be measured. The part of the bolt section 11 received in the receiving bore 12 comprises a recess 13 in which a wear sensing device 9 is arranged.

The bolt section 11 adjoining the clamping length 8 does not have to bear the load necessary for clamping the shoe 4 to the track link body 2. Therefore, the bolt 5 can comprise a recess 13 for receiving the wear sensing device 9. In the embodiment shown in FIG. 1, the recess 13 is a bore 16 which is coaxially aligned with the bolt section 11.

The wear sensing device 9 comprises a near field communication (NFC) element 14 for communicating the wear data 17 to a data receiving device 15. The data receiving device 15 shown in FIG. 1 is a mobile phone, but alternatively it can be any other type of data receiving device, such a tablet or a laptop, or it can be non-mobile data receiving devices such as stationary computers or data receiving devices installed in the dashboard of the track chain construction vehicle.

The wear sensing device 9 is pressed into the bore 16 via a press-fit. In this way the wear sensing device is securely held in position in the bore 16 without the need of additional retaining elements.

In the embodiment shown in FIG. 1 the wear sensing device 9 comprises a self-consuming wear portion which wears together with the surface portion 10 of which the wear is to be measured. Therefore, the wear sensing device 9 is very robust and functioning very reliably under the rough operating conditions in which the track chain construction machines operate.

It is very easy to mount the wear sensing device 9 to the track link body 2 because the wear sensing device can be inserted into the recess 13 either before or after mounting the bolt 5 to the track link body 2. Mounting the wear sensing device 9 is especially easy when the wear sensing device 9 is inserted into the recess 13 before mounting the bolt 5, because then the wear sensing device can be mounted simply by inserting the bolt 5 into the window opening 3, then screwing the nut 6 onto the bolt 5, and then screwing the bolt 5 with the bolt section 11 into the receiving bore 12 of the track link body 2.

For the same reason it is also very easy to replace an old wear sensing device 9 with a new one, because it is only necessary to replace the bolt 5 mounted to the rack link body 2 with a new replacement bolt 5 equipped with a new wear sensing device 9.

REFERENCE SIGNS LIST

1 track assembly
2 track link body
3 window opening
4 shoe
5 bolt
6 nut
7 bolt head
8 clamping length
9 wear sensing device
10 surface portion
11 bolt section
12 receiving bore
13 recess
14 near field communication (NFC) element
15 data receiving device
16 bore
17 wear data

The invention claimed is:

1. A track assembly of a track-type mobile machine, comprising:

a track link body including a first window opening and a second window opening;

a track shoe;

a first bolt and a second bolt that attach the track shoe to the track link body, wherein the track shoe is clamped with the track link body along a clamping length of the first bolt, the clamping length extending from a bolt head of the first bolt to a fastening section of the first bolt; and a wear sensing device for measuring wear of a surface portion of the track link body;

wherein the first bolt includes a bolt section adjoining the clamping length, the bolt section extending into a receiving bore arranged in the track link body, the receiving bore extending from the first window opening to the surface portion of the track link body where the wear is to be measured;

wherein a part of the bolt section received in the receiving bore includes a recess and the wear sensing device is arranged in the recess.

2. A track assembly as claimed in claim 1, wherein the fastening section is screwed into the receiving bore, so that the clamping length extends from the bolt head to the receiving bore, wherein the bolt section extends from the fastening section to the surface portion of the track link body.

3. A track assembly as claimed in claim 1, wherein the fastening section is screwed into a nut, wherein the nut is arranged inside the first window opening, so that the clamping length extends from the bolt head to the nut, wherein the bolt section extends from the fastening section through the first window opening to the surface portion of the track link body.

4. A track assembly as claimed in claim 1, wherein the wear sensing device comprises a near-field communication element for transmitting wear data from the wear sensing device to a data receiving device.

5. A track assembly as claimed in claim 1, wherein the recess is formed as a bore arranged coaxially with the bolt section, wherein the wear sensing device is arranged in the bore.

6. A track assembly as claimed in claim 1, wherein the wear sensing device is pressed into the recess by a press fit.

7. A track assembly as claimed in claim 1, wherein the recess has an internal thread and the wear sensing device has a housing with an external thread, wherein the wear sensing device is screwed into the recess with the external thread.

8. A track assembly as claimed in claim 1, wherein the wear sensing device comprises a wear portion which wears together with the surface portion of which the wear is to be measured.

9. A method for mounting a wear sensing device for measuring wear of a surface portion of a track link body to a track assembly of a track-type mobile machine, comprising:

receiving the track assembly, wherein the track assembly includes:

the track link body, including a first window opening and a second window opening;

a track shoe; and a first bolt and a second bolt that attach the track shoe to the track link body, wherein the track shoe is clamped with the track link body along a clamping length of the first bolt, the clamping length extending from a bolt head of the first bolt to a fastening section of the first bolt;

wherein the first bolt includes a bolt section adjoining the clamping length, the bolt section configured to extend into a receiving bore arranged in the track link body, the receiving bore extending from the first window opening to the surface portion of the track link body where the wear is to be measured;

wherein a part of the bolt section configured to be received in the receiving bore includes a recess and the wear sensing device is configured to be arranged in the recess; and inserting the wear sensing device into the recess in the bolt section via a press-fit either before or after the bolt section is inserted into the receiving bore in the track link body.

10. A method of replacing a used wear sensing device of a track assembly, comprising:

receiving the track assembly, wherein the track assembly includes:

a track link body including a first window opening and a second window opening;

a track shoe;

a first bolt and a second bolt that attach the track shoe to the track link body, wherein the track shoe is clamped with the track link body along a clamping length of the first bolt, the clamping length extending from a bolt head of the first bolt to a fastening section of the first bolt; and the used wear sensing device for measuring wear of a surface portion of the track link body;

wherein the first bolt includes a bolt section adjoining the clamping length, the bolt section extending into a receiving bore arranged in the track link body, the receiving bore extending from the first window opening to the surface portion of the track link body where the wear is to be measured;

wherein a part of the bolt section received in the receiving bore includes a recess and the used wear sensing device is arranged in the recess;

receiving a replacement bolt having a clamping length section and a bolt section adjoining the clamping length section, wherein a replacement wear sensing device is inserted into a recess in the bolt section of the replacement bolt;

removing the first bolt with the used wear sensing device from the track link body; and mounting the replacement bolt to the track link body.

* * * * *